(12) United States Patent
Tang et al.

(10) Patent No.: US 11,130,517 B2
(45) Date of Patent: Sep. 28, 2021

(54) ENERGY DYNAMIC CONTROL SYSTEM AND METHOD FOR THE EPS WITH HYBRID POWER SUPPLY

(71) Applicant: JIANGSU UNIVERSITY, Jiangsu (CN)

(72) Inventors: Bin Tang, Jiangsu (CN); Yingqiu Huang, Jiangsu (CN); Haobin Jiang, Jiangsu (CN); Di Zhang, Jiangsu (CN); Chaochun Yuan, Jiangsu (CN); Yingfeng Cai, Jiangsu (CN); Guoqing Geng, Jiangsu (CN); Chaofeng Pan, Jiangsu (CN); Shidian Ma, Jiangsu (CN); Dong Cao, Jiangsu (CN); Chenhui Yin, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 45 days.

(21) Appl. No.: 16/627,980

(22) PCT Filed: May 23, 2018

(86) PCT No.: PCT/CN2018/087960
§ 371 (c)(1),
(2) Date: Dec. 31, 2019

(87) PCT Pub. No.: WO2019/213993
PCT Pub. Date: Nov. 14, 2019

(65) Prior Publication Data
US 2020/0156699 A1 May 21, 2020

(30) Foreign Application Priority Data
May 9, 2018 (CN) .......................... 201810438771.7

(51) Int. Cl.
*B62D 5/04* (2006.01)
*G06F 30/20* (2020.01)
(Continued)

(52) U.S. Cl.
CPC ............. *B62D 5/0463* (2013.01); *B62D 3/02* (2013.01); *B62D 15/0215* (2013.01);
(Continued)

(58) Field of Classification Search
CPC ........ B62D 5/04; B62D 3/02; B62D 15/0215; G06F 30/15; G06F 2119/06; H02J 7/345;
(Continued)

(56) References Cited
U.S. PATENT DOCUMENTS

| | | | |
|---|---|---|---|
| 5,780,980 A | 7/1998 | Naito | |
| 2006/0028778 A1* | 2/2006 | O'Gorman | H02J 1/14 361/62 |

(Continued)

FOREIGN PATENT DOCUMENTS

| | | |
|---|---|---|
| CN | 201329893 Y | 10/2009 |
| CN | 101878135 A | 11/2010 |

(Continued)

*Primary Examiner* — Jared Fureman
*Assistant Examiner* — Duc M Pham
(74) *Attorney, Agent, or Firm* — Schwabe Williamson & Wyatt, PC

(57) ABSTRACT

An energy dynamic control method for the EPS with hybrid power supply and an energy dynamic control system. Control system collects real-time current of vehicle electric appliances except the steering motor and the super-capacitor and calculates target current of the steering motor according to real-time steering torque and vehicle speed, and determines state of the super-capacitor by comparing rated current of vehicle power supply and sum of the current of vehicle electric appliances and target current of the steering motor. When super-capacitor is in the charging state, charg- (Continued)

ing current is dynamically regulated to make vehicle power supply work in optimal working range, and maximum charging current is limited based on SOC of the super-capacitor. When super-capacitor is in discharging state, discharging current is dynamically regulated to make vehicle power supply work in optimal working range, and maximum discharging current is limited based on SOC of super-capacitor.

8 Claims, 2 Drawing Sheets

(51) Int. Cl.
    *H02J 7/00*     (2006.01)
    *G06F 30/15*     (2020.01)
    *B62D 3/02*     (2006.01)
    *B62D 15/02*     (2006.01)
    *G06F 119/06*     (2020.01)
    *H02J 7/34*     (2006.01)
    *H02M 3/158*     (2006.01)

(52) U.S. Cl.
    CPC .............. *G06F 30/15* (2020.01); *G06F 30/20* (2020.01); *H02J 7/0048* (2020.01); *G06F 2119/06* (2020.01); *H02J 7/345* (2013.01); *H02J 2207/20* (2020.01); *H02M 3/1582* (2013.01)

(58) Field of Classification Search
CPC ... H02J 2207/20; H02J 2207/50; H02M 3/158
See application file for complete search history.

(56) References Cited

U.S. PATENT DOCUMENTS

| | | | | |
|---|---|---|---|---|
| 2010/0253140 | A1* | 10/2010 | Yamashita | B62D 5/046 307/9.1 |
| 2013/0099759 | A1 | 4/2013 | Ura | |
| 2014/0265560 | A1* | 9/2014 | Leehey | B60L 58/13 307/10.1 |
| 2015/0224845 | A1* | 8/2015 | Anderson | B60G 17/052 701/37 |
| 2017/0137023 | A1* | 5/2017 | Anderson | B60W 50/14 |

FOREIGN PATENT DOCUMENTS

| | | |
|---|---|---|
| CN | 103112491 A | 5/2013 |
| CN | 103818329 A | 5/2014 |
| CN | 103003134 B | 6/2015 |
| CN | 106427615 A | 2/2017 |
| JP | 2001339872 A | 12/2001 |
| JP | 2003320942 A | 11/2003 |
| JP | 2007223510 A | 9/2009 |

\* cited by examiner

※ENERGY DYNAMIC CONTROL SYSTEM AND METHOD FOR THE EPS WITH HYBRID POWER SUPPLY

CROSS-REFERENCE TO RELATED APPLICATION

The present application is a national phase entry under 35 U.S.C. § 371 of International Application No. PCT/CN2018/087960, filed May 23, 2018, which designates the United States of America, which claims priority to CN Application No. 201810438771.7, filed May 9, 2018, the entire disclosures of each of these applications are hereby incorporated by reference in their entireties and for all purposes.

TECHNICAL FIELD

The invention relates to the technical field of vehicle steering system, in particular to an energy dynamic control system and method for electric power steering system in commercial vehicles with hybrid power supply.

BACKGROUND ART

Recently, the Electric Power Steering system (EPS) has been widely used in passenger vehicles and lightweight commercial vehicles for its advantages of safety, energy saving and environment protection. The assist torque is provided by the steering motor directly in EPS system, whose value is controlled by ECU. EPS can easily realize the variable assist characteristics with vehicle speed, and help to improve the vehicle's handling stability. In another way, it scarcely consumes electric energy under non-steering conditions, which greatly reduces energy consumption. Because of the advantages mentioned above, EPS will be the development trend of steering system in the future.

Although EPS has been applied in lightweight commercial vehicles, there are some limitations for the application of EPS in heavy-duty commercial vehicles, among which the existing vehicle power supply system can't provide enough steering assist power especially under the condition of pivot steering or low-speed steering because of high load on the front axis. Therefore, it is of great research value and practical significance to develop a new type of EPS for heavy-duty commercial vehicles and solve the scientific and technical problems existing in the new solution.

As a new type of energy storage system, the super-capacitor has advantages of fast charging and discharging, large discharging current, good dynamic performance, high cycle efficiency up to 90%-95%, simple control and environment protection. Therefore, the super-capacitor has been widely used in engine start-stop system and electric vehicle auxiliary energy storage recently. The super-capacitor is also applied in EPS system as an auxiliary power supply to constitute the new type of EPS system with hybrid power supply.

As an effective solution to the application of EPS in heavy-duty commercial vehicles, some domestic and foreign researchers have done some studies about the EPS system with hybrid power supply which is constituted of an alternator and a super-capacitor. In the patent numbered as CN103003134B, a system and method is proposed to detect the output faults of EPS energy storage with main power supply and auxiliary power supply, which reduces the size and cost of the EPS controller. The patent numbered as CN103818329B presents a method that the super-capacitor is charged by main power supply under normal conditions and provides drive current for EPS motor together with main power supply under poor steering conditions. The patent numbered as JP2003320942A presents an electric power steering system using capacitors as auxiliary power supply, which provides auxiliary steering power at low speed to reduce the capacity of the main power supply and improve the adaptability of the power supply. In the patent numbered as JP2007223510A, a new type of electric power steering device is proposed, which is characterized by an auxiliary power supply in series with a main power supply. In the patents mentioned above, the design and control methods of the EPS with hybrid power supply are not involved from the aspects of energy distribution and system efficiency.

SUMMARY

In order to solve the problem of assist torque ripple and energy waste caused by unreasonable energy regulation between the vehicle power supply and the super-capacitor, the present invention provides an energy dynamic control system and method for the EPS with hybrid power supply. To realize energy balance and high energy conversion efficiency, the control strategy and method of the EPS with hybrid power supply are improved. The improvement of the method provides a reasonable and effective solution for the application of the EPS with hybrid power supply in heavy-duty commercial vehicles through the dynamic control of current to achieve high efficiency and energy saving.

The energy dynamic control method for the EPS with hybrid power supply includes the following steps:

Step 1: Acquire the real-time current $I_{EB}$ of vehicle electric appliances except the steering motor and the super-capacitor, and obtain the target current $I_M$ of the steering motor;

Step 2: Determine the charging or discharging state of the super-capacitor according to the difference of current I between the rated current $I_D$ of the vehicle power supply and the sum of the current $I_{EB}$ and the current $I_M$;

Step 3: Calculate state of charge (SOC) of the super-capacitor;

Step 4: When the super-capacitor is in the charging state, calculate the maximum charging current $I_1$ by SOC of the super-capacitor, when the super-capacitor is in the discharging state, calculate the maximum discharging current $I_2$ by SOC of the super-capacitor;

Step 5: Calculate the difference of current I' between the current $I_D$ of the vehicle power supply in the optimal working range and the sum of the current $I_{EB}$ and the current $I_M$;

Step 6: Determine the working current $I_C$ of the super-capacitor;

Step 7: Regulate current of the super-capacitor in different working states including vehicle power supply state, hybrid power supply state and super-capacitor power supply state.

Further, the real-time current $I_{EB}$ of vehicle electric appliances and the target current $I_M$ of the steering motor mentioned in step 1 is obtained by the following steps:

Step 1.1: The real-time current $I_{EB}$ of vehicle electric appliances except the steering motor and the super-capacitor is acquired and summed by adding current sampling circuits in each branch of the vehicle power supply;

Step 1.2: The steering controller collects the signal of steering torque T, steering angle θ and vehicle speed v, and calculates the target current $I_M$ of the steering motor by the target current computation algorithm.

The target current computation algorithm is shown as following:

The dynamics model of the EPS with hybrid power supply is built in MATLAB/SIMULINK. The steering resistance torque of the vehicle under different driving conditions is simulated by inputting different steering torque, steering angle and vehicle speed into the simulation model. The steering resistance torque subtracts drivers' preferred steering torque under the corresponding driving conditions to obtain the steering assist torque. Target current of the steering motor is obtained by dividing the steering assist torque by electromagnetic torque coefficient of the steering motor. The function of target current of the steering motor $I_M = f(T,\theta,v)$ with steering torque, steering angle and vehicle speed is deduced. Based on the function, the real-time target current of the steering motor is obtained by the real-time steering torque, steering angle and vehicle speed.

Further, the calculation of the difference of current I between the rated current $I_D$ of the vehicle power supply and the sum of the current $I_{EB}$ and the current $I_M$, and the determination of charging or discharging state of the super-capacitor mentioned in step 2 are obtained by the following steps:

Step 2.1: The rated current $I_D$ of the vehicle power supply is obtained by referring to parameters table of the alternator in the vehicle power supply;

Step 2.2: The formula for calculating the difference of current I is as following:

$$I = I_D - (I_{EB} + I_M)$$

Step 2.3: The charging or discharging state of the super-capacitor is determined as follows: when the difference of current I is greater than zero, the super-capacitor is in the charging state, the controller regulates the bidirectional DC-DC converter by PWM technique in the boost state, when the difference of current I is less than or equal to zero, the super-capacitor is in the discharging state, the controller regulates the bidirectional DC-DC converter in the buck state.

Further, SOC of the super-capacitor mentioned in step 3 is obtained by the following steps:

Step 3.1: Through the charging and discharging tests of the super-capacitor, the highest voltage $V_{max}$ of the super-capacitor in full charge state and the lowest voltage $V_{min}$ in lack charge state is obtained;

Step 3.2: The voltage sampling circuit is added to the terminal of the super-capacitor to detect the real-time voltage V of the super-capacitor;

Step 3.3: SOC of the super-capacitor is calculated by the following formula:

$$SOC = (V - V_{min})/(V_{max} - V_{min})$$

Further, the maximum charging current $I_1$ and the maximum discharging current $I_2$ of the super-capacitor mentioned in step 4 is obtained by the following steps:

Step 4.1: When the super-capacitor is in the charging state, the super-capacitor is charged in the minimum interval time of two times of extremely low-speed steering, the average charging current $I'_1$ of the super-capacitor is calculated by the following formula:

$$SOC + (T_{j\,min} \cdot I'_1)/Q = 1$$

Where $T_{j\,min}$ is the minimum interval time of two times of extremely low-speed steering, which is obtained by the road test, Q is the capacity of the super-capacitor.

The average charging current $I'_1$ mentioned above is chosen as the limiting maximum charging current of the super-capacitor, and the formula for calculating the maximum charging current is as follows:

$$I_1 = (1 - SOC) \cdot Q/T_{j\,min}$$

Step 4.2: When the super-capacitor is in the discharging state, the super-capacitor is discharged to the minimum state of charge SOC' in the longest time during which the single extremely low-speed steering is implemented, the average discharging current $I'_2$ of the super-capacitor is calculated by the following formula:

$$SOC - (T_{max} \cdot I'_2)/Q = SOC'$$

Where $T_{max}$ is the longest time during which the single extremely low-speed steering is implemented, which is obtained by the road test, SOC' is the minimum state of charge of the super-capacitor, Q is the capacity of the super-capacitor.

The average discharging current $I'_2$ mentioned above is chosen as the limiting maximum discharging current of the super-capacitor, and the formula for calculating the maximum discharging current $I_2$ is as follows:

$$I_2 = (SOC - SOC') \cdot Q/T_{max}$$

Further, the difference of current I' mentioned in step 5 is obtained by the following steps:

Step 5.1: The current $I'_D$ of the vehicle power supply in the optimal working range is obtained by the efficiency test of the alternator in the vehicle power supply.

Step 5.2: The formula for calculating the difference of current I' between the current $I'_D$ of the vehicle power supply in the optimal working range and the sum of the current $I_{EB}$ and the current $I_M$ is as follows:

$$I' = I'_D - (I_{EB} + I_M)$$

Further, the charging or discharging current $I_C$ of the super-capacitor mentioned in step 6 is obtained by the following steps:

Step 6.1: When the super-capacitor is in the charging state, the difference of current I' is compared with the maximum charging current $I_1$ calculated by step 4.1. If the difference of current I' does not exceed the maximum charging current $I_1$, the charging current $I_C$ of the super-capacitor will be set as I', otherwise the charging current $I_C$ will be set as $I_1$.

Step 6.2: When the super-capacitor is in the discharging state, the difference of current I' is compared with the maximum discharging current $I_2$ calculated by step 4.2. If the absolute value of the difference of current I' does not exceed the maximum discharging current $I_2$, the discharging current $I_C$ of the super-capacitor will be set as I', otherwise the discharging current $I_C$ will be set as $-I_2$.

The energy dynamic control system for the EPS with hybrid power supply includes the steering controller, the steering torque and angle sensor, the bidirectional DC-DC converter, the steering motor, the circulating ball steering gear and the super-capacitor. The steering torque and angle sensor fixed on the middle of the steering column, the circulating ball steering gear is connected to the bottom of the steering column, the steering motor is connected to the circulating ball steering gear by the worm and gear mechanism. The steering torque and angle sensor collects the steering torque and angle as the input signals of the steering controller, the steering controller also collects vehicle speed signal and the electric power of vehicle electric appliances and then implements the corresponding power allocation strategy, so as to control the bidirectional DC-DC converter and the steering motor; the bidirectional DC-DC converter regulates the charging and discharging of the super-capacitor, the steering motor outputs steering assist power to the circulating ball steering gear. The steering controller controls the working state of the vehicle power supply and super-capacitor by judging the charge or discharge state of super-capacitor and calculating the working current of super-capacitor.

Compared with prior art, the beneficial effects of the present invention are: As stated above, the control method proposed in the present invention is to dynamically switch the charging and discharging state of the super-capacitor and regulate the charging current and discharging current so as to realize the efficient distribution and utilization of the vehicle power supply and suppress the power fluctuation of vehicle electric appliances caused by the power fluctuation of the steering motor. Under the premise of satisfying the EPS function, the vehicle power supply can be in or as close as possible to its optimal working range under any working condition, thus improve energy conversion efficiency and reduce energy consumption.

EMBODIMENTS

The present invention is further described combining with the drawings and specific implementations, but the protection scope of the present invention is not limited as this.

Figure 1:
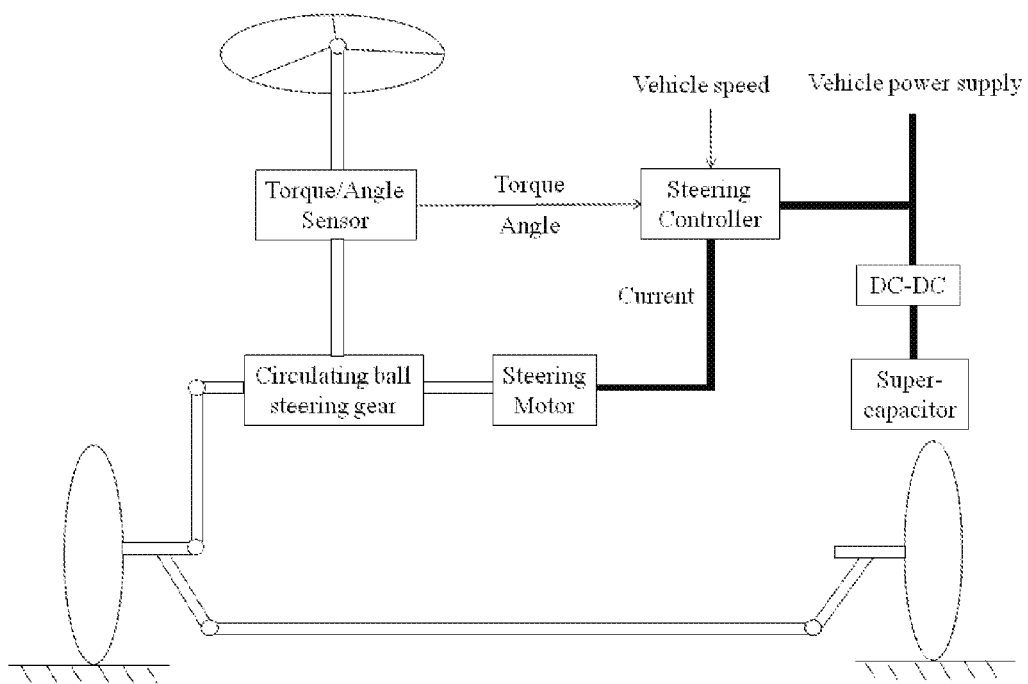
FIG. 1 is the schematic diagram of the EPS with hybrid power supply.

The EPS with hybrid power supply is presented in FIG. 1 including the steering controller, the steering torque and angle sensor, the bidirectional DC-DC converter, the steering motor, the circulating ball steering gear, the vehicle power supply and the super-capacitor. The steering torque and angle sensor fixed on the middle of the steering column. The steering wheel is fixed on the top of the steering column, and the circulating ball steering gear is connected to the bottom of the steering column. The steering motor is connected to the circulating ball steering gear by the worm and gear mechanism. The circulating ball steering gear is connected to the steered wheel by the rocker link mechanism. The steering torque and angle sensor collects steering torque and angle as the input signals of the steering controller. The steering controller also collects vehicle speed signal and the electric power of vehicle electric appliances to determine the charging or discharging state of the super-capacitor and calculate the charging or discharging current of the super-capacitor, so as to control the bidirectional DC-DC converter and steering motor. The bidirectional DC-DC converter regulates the charging and discharging of the super-capacitor. The steering controller and the bidirectional DC-DC converter are all connected to the vehicle power supply. The vehicle power supply and the super-capacitor provide electric power for the steering motor together if required.

When the driver turns the steering wheel, the steering torque and angle sensor collects the torque and angle signals and send them to the steering controller. The steering controller also collects vehicle speed and electric power of vehicle electric appliances. Based on the target current look-up table, the target current of the steering motor is obtained. By the bidirectional DC-DC converter, the steering controller control the hybrid power supply constituted by the super-capacitor and the vehicle power supply to output appropriate current to the steering motor under different working conditions, so that the circulating ball steering gear can provide steering assist torque.

Figure 2:
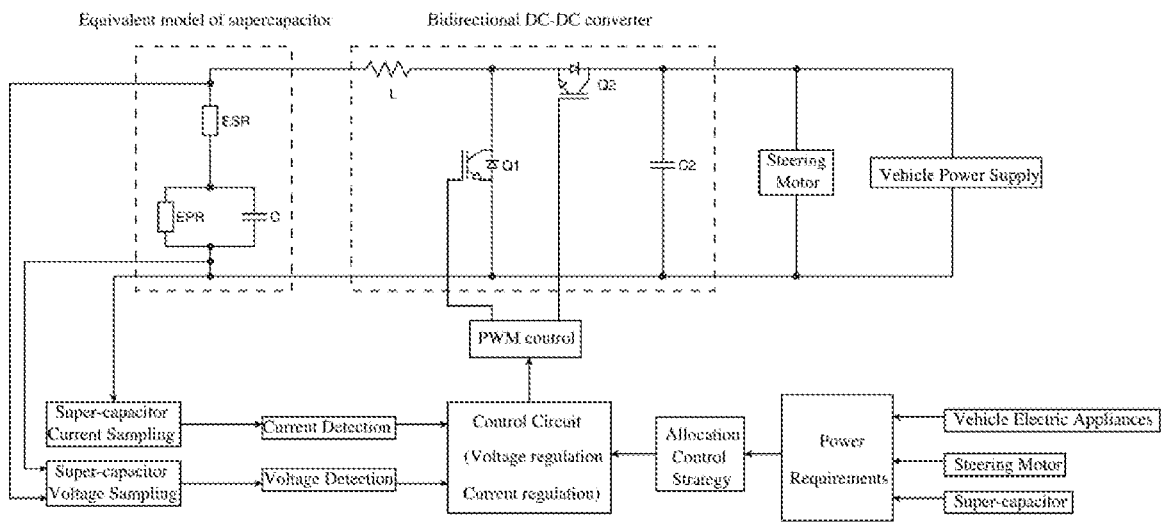
FIG. 2 is the control principle diagram of the bidirectional DC-DC converter.

FIG. 2 is the control principle diagram of the bidirectional DC-DC converter. The super-capacitor is in series with the bidirectional DC-DC converter and then in parallel with the vehicle power supply and the steering motor. The equivalent mathematical model of the super-capacitor is shown in the left part of control principle diagram where EPR is leakage current resistance which represents the leakage current effect of the super-capacitor. ESR is equivalent series resistance which affects discharging capacity of the super-capacitor. C is equivalent capacitance of the super-capacitor. EPR is in parallel with C then in series with ESR. The middle block diagram shows a bidirectional DC-DC converter in which the capacitor C2 is in series with the MOSFET Q2, then in parallel with the MOSFET Q1, and finally in series with the inductor L. The super-capacitor is in parallel with the vehicle power supply through the bidirectional DC-DC converter to provide electric power for the steering motor. The steering controller implements the corresponding power allocation strategy and send control signal to the control circuit of the bidirectional DC-DC convertor according to the power requirements of vehicle electric appliances, the steering motor and the super-capacitors under different driving conditions. The current sampling circuit and voltage sampling circuit respectively detect the real-time current and voltage of the super-capacitor and send them to the control circuit. The control circuit combines with the control signal sent by the steering controller to regulate the bidirectional DC-DC converter by PWM technique, so as to realize the dynamic control of the charging and discharging current of the super-capacitor.

The power allocation strategy is as following. When the vehicle speed is low, the vehicle power supply and the super-capacitor together provide electric power for the steering motor. The steering controller determines the way and proportion of the vehicle power supply and the super-capacitor to provide the electric power according to the signal of vehicle speed and steering angle. When the vehicle speed is high, the vehicle power supply provides electric power for the steering motor alone. At the same time, the super-capacitor is in the charging state as the load of the vehicle power supply. When the vehicle power supply fails, the super-capacitor alone provides the electric power for the steering motor to maintain the steering assist torque for a short time. So the EPS with hybrid power supply has three modes: hybrid power supply mode, vehicle power supply mode and super-capacitor mode.

Figure 3:
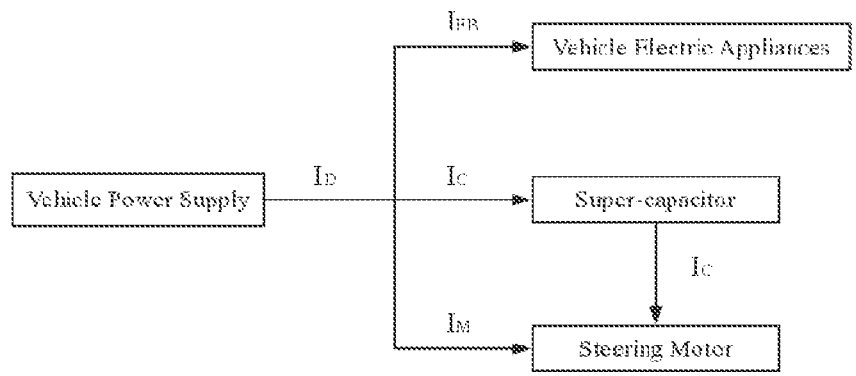
FIG. 3 is the schematic diagram of energy flow of the hybrid power supply.

FIG. 3 is the schematic diagram of energy flow of the hybrid power supply. Electric power from the vehicle power supply is provided to vehicle electric appliances and the steering motor and the super-capacitor. Electric energy stored in the super-capacitor is released to the steering motor if required.

Figure 4:
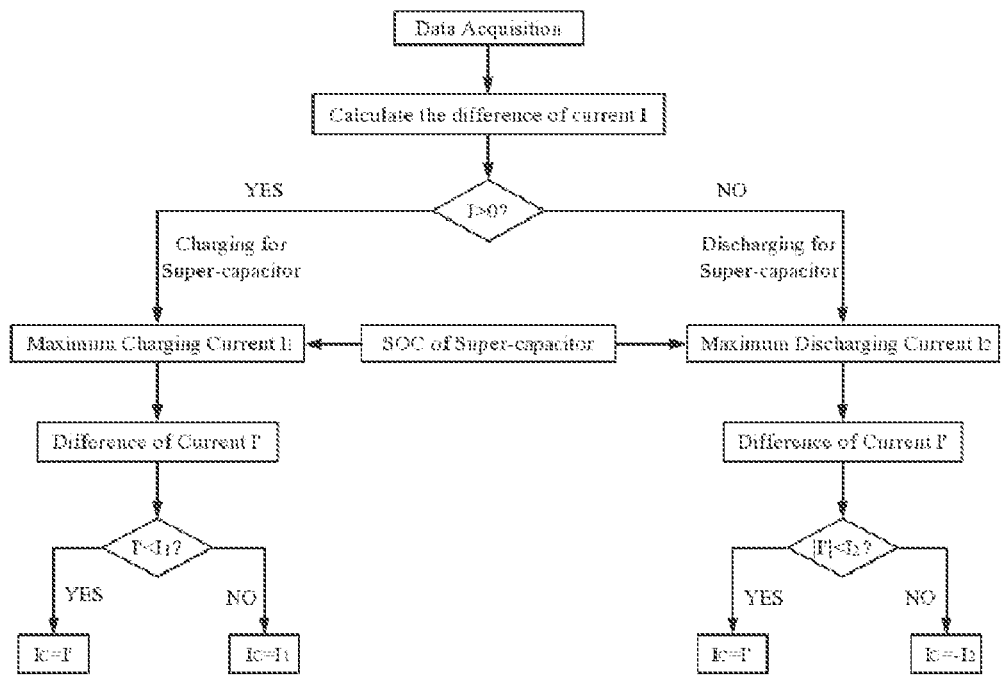
FIG. 4 is the energy dynamic control flow chart of charging and discharging current of the super-capacitor.

FIG. 4 is the energy dynamic control flow chart of charging and discharging current of the super-capacitor. The energy dynamic control method includes the following steps:

Step 1: Acquire the real-time current $I_{EB}$ of vehicle electric appliances except the steering motor and the super-capacitor and calculate the target current $I_M$ of the steering motor. The real-time current $I_{EB}$ of vehicle electric appliances and the target current $I_M$ of the steering motor are obtained by the following steps:

Step 1.1: The real-time current $I_{EB}$ of vehicle electric appliances except the steering motor and the super-capacitor is acquired and summed by adding current sampling circuits in each branch of the vehicle power supply;

Step 1.2: The steering controller collects the signal of steering torque T, steering angle signal θ and vehicle speed v, and calculates the target current $I_M$ of the steering motor by the target current computation algorithm;

Step 1.3: The target current computation algorithm is obtained by following steps:

Step 1.3.1: The dynamics model of the EPS with hybrid power supply is built in MATLAB/SIMULINK;

Step 1.3.2: The steering resistance torque of the vehicle under different driving conditions is simulated by inputting different steering torque, steering angle and vehicle speed into the simulation model;

Step 1.3.3: The steering resistance torque subtracts drivers' preferred steering torque under the corresponding driving conditions to obtain the steering assist torque;

Step 1.3.4: Target current of the steering motor is obtained by dividing the steering assist torque by electromagnetic torque coefficient of the steering motor;

Step 1.3.5: The function of target current of the steering motor $I_M = f(T, \theta, v)$ with steering torque, steering angle and vehicle speed is deduced;

Step 1.3.6: Based on the function mentioned in step 1.3.5, the real-time target current of the steering motor is obtained by the real-time steering torque, steering angle and vehicle speed.

Step 2: Determine charging or discharging state of the super-capacitor according to the difference of current I between the rated current $I_D$ of the vehicle power supply and the sum of the current $I_{EB}$ and the current $I_M$. The determination of charging or discharging state of the super-capacitor is obtained by the following steps:

Step 2.1: The rated current $I_D$ of the vehicle power supply is obtained by referring to parameters table of the alternator in the vehicle power supply;

Step 2.2: The formula for calculating the difference of current I is as following:

$$I = I_D - (I_{EB} + I_M) \quad (1)$$

Step 2.3: The charging or discharging state of the super-capacitor is determined as follows: when the difference of current I is greater than zero, the super-capacitor is in the charging state, the controller regulates the bidirectional DC-DC converter by PWM technique in the boost state, when the difference of current I is less than or equal to zero, the super-capacitor is in the discharging state, the controller regulates the bidirectional DC-DC converter in the buck state.

Step 3: Calculate state of charge (SOC) of the super-capacitor by the following steps:

Step 3.1: Through the charging and discharging tests of the super-capacitor, the highest voltage $V_{max}$ of the super-capacitor in full charge state and the lowest voltage $V_{min}$ in lack charge state is obtained;

Step 3.2: The voltage sampling circuit is added to the terminal of the super-capacitor to detect the real-time voltage V of the super-capacitor;

Step 3.3: SOC of the super-capacitor is calculated by the following formula:

$$SOC = (V - V_{min}) / (V_{max} - V_{min}) \quad (2)$$

Step 4: When the super-capacitor is in the charging state, the maximum charging current $I_1$ is calculated by SOC of the super-capacitor, when the super-capacitor is in the discharging state, the maximum discharging current $I_2$ is calculated by SOC of the super-capacitor. The process is as the following steps:

Step 4.1: When the super-capacitor is in the charging state, the super-capacitor is charged in the minimum interval time of two times of extremely low-speed steering, the average charging current $I'_1$ of the super-capacitor is calculated by the following formula:

$$SOC + (T_{j\,min} \cdot I'_1)/Q = 1 \quad (3)$$

Where $T_{j\,min}$ is the minimum interval time of two times of extremely low-speed steering, which is obtained by road test, Q is the capacity of the super-capacitor selected.

In order to fully play the role of super-capacitor in compensating for power fluctuations of vehicle electrical appliances, and to ensure that the alternator is in or near the optimal working area for a longer time, the charging power of super-capacitor cannot be too large, that is, the charging current of super-capacitor should be limited.

The average charging current $I'_1$ mentioned above is chosen as the limiting maximum charging current of the super-capacitor, and the formula for calculating the maximum charging current is as follows:

$$I_1 = (1 - SOC) \cdot Q / T_{j\,min} \quad (4)$$

Step 4.2: When the super-capacitor is in the discharging state, the super-capacitor is discharged to the minimum state of charge SOC' in the longest time during which the single extremely low-speed steering is implemented, the average discharging current $I'_2$ of the super-capacitor is calculated by the following formula:

$$SOC - (T_{max} \cdot I'_2)/Q = SOC' \quad (5)$$

Where $T_{max}$ is the longest time during which the single extremely low-speed steering is implemented, which is obtained by road test, SOC' is the minimum state of charge of the super-capacitor, Q is the capacity of the super-capacitor.

In order to meet the performance requirements of EPS while giving full play to the role of super-capacitor in compensating for power fluctuations of vehicle electrical appliances, so that the alternator can be in or near the optimal working area for a longer time, the discharging power of super-capacitor cannot be too large, that is, the discharging current of super-capacitor should be limited.

The average discharging current $I'_2$ mentioned above is chosen as the limiting maximum discharging current of the super-capacitor, and the formula for calculating the maximum discharging current is as follows:

$$I_2 = (SOC - SOC') \cdot Q / T_{max} \quad (6)$$

Step 5: Calculate the difference of current I' between the current $I'_D$ of the vehicle power supply in the optimal working range and the sum of the current $I_{EB}$ and the current $I_M$ by the following steps:

Step 5.1: The current $I'_D$ of the vehicle power supply in the optimal working range is obtained by the efficiency test of the alternator in the vehicle power supply.

Step 5.2: The formula for calculating the difference of current I' between the current $I'_D$ of the vehicle power supply in the optimal working range and the sum of the current $I_{EB}$ and the current $I_M$ is as follows:

$$I' = I'_D - (I_{EB} + I_M) \quad (7)$$

Step 6: Determine the working current $I_C$ of the super-capacitor by the following steps:

Step 6.1: When the super-capacitor is in the charging state, the difference of current I' is compared with the maximum charging current $I_1$ calculated by step 4.1. If the difference of current I' does not exceed the maximum charging current $I_1$, the charging current $I_C$ of the super-capacitor will be set as I', otherwise the charging current $I_C$ will be set as $I_1$.

Step 6.2: When the super-capacitor is in the discharging state, the difference of current I' is compared with the maximum discharging current $I_2$ calculated by step 4.2. If the absolute value of the difference of current I' does not exceed the maximum discharging current $I_2$, the discharging current $I_C$ of the super-capacitor will be set as I', otherwise the discharging current $I_C$ will be set as $-I_2$.

Step 7: Regulate current of the super-capacitor by the bidirectional DC-DC converter in different working modes including vehicle power supply mode, hybrid power supply mode and super-capacitor mode.

The foregoing detailed descriptions of the specific implementation ways are provided to illustrate how to preferably implement the present invention and shall not be regarded as any limitation to the scope of the present invention. For those technicians in the field, various modifications or variations may be made easily to the present invention according to the method given by the present invention to achieve the performance level of the present invention. Therefore, any modifications and variations shall fall into the scope defined by the claims of the present invention.

The invention claimed is:

1. The energy dynamic control method for the EPS with hybrid power supply includes the following steps:
   step 1: acquire the real-time current $I_{EB}$ of vehicle electric appliances except the steering motor and the super-capacitor, and obtain the target current $I_M$ of the steering motor;
   step 2: determine the charging or discharging state of the super-capacitor according to the difference of current I between the rated current $I_D$ of the vehicle power supply and the sum of the current $I_{EB}$ and the current $I_M$;
   step 3: calculate state of charge (SOC) of the super-capacitor;
   step 4: when the super-capacitor is in the charging state, calculate the maximum charging current $I_1$ by SOC of the super-capacitor, when the super-capacitor is in the discharging state, calculate the maximum discharging current $I_2$ by SOC of the super-capacitor;
   step 5: calculate the difference of current I' between the current $I'_D$ of the vehicle power supply in the optimal working range and the sum of the current $I_{EB}$ and the current $I_M$;
   step 6: calculate the working current $I_C$ of the super-capacitor;
   step 7: control the working state of vehicle power supply and super-capacitor according to the working state of super capacitor.

2. The energy dynamic control method for the EPS with hybrid power supply described in claim 1 is characterized that the data collection method mentioned in step 1 is shown as follows:
   step 1.1: the real-time current $I_{EB}$ of vehicle electric appliances except the steering motor and the super-capacitor is acquired and summed by adding current sampling circuits in each branch of the vehicle power supply;
   step 1.2: the steering controller collects the signal of steering torque T, steering angle θ and vehicle speed v, and calculates the target current $I_M$ of the steering motor by the target current computation algorithm.

3. The energy dynamic control method for the EPS with hybrid power supply described in claim 1 is characterized that the specific process of step 2 is as follows:
   step 2.1: the rated current $I_D$ of the vehicle power supply is obtained by referring to parameters table of the alternator in the vehicle power supply;
   step 2.2: the charging or discharging state of the super-capacitor is determined as follows: when the difference of current I is greater than zero, the super-capacitor is in the charging state, the controller regulates the bidirectional DC-DC converter by PWM technique in the boost state; when the difference of current I is less than or equal to zero, the super-capacitor is in the discharging state, the controller regulates the bidirectional DC-DC converter in the buck state.

4. The energy dynamic control method for the EPS with hybrid power supply described in claim 1 is characterized that SOC of the super-capacitor mentioned in step 3 is obtained by the following steps:
   step 3.1: through the charging and discharging tests of the super-capacitor, the highest voltage $V_{max}$ of the super-capacitor in full charge state and the lowest voltage $V_{min}$ in lack charge state is obtained;
   step 3.2: the voltage sampling circuit is added to the terminal of the super-capacitor to detect the real-time voltage V of the super-capacitor;
   step 3.3: SOC of the super-capacitor is calculated by the following formula:

$$SOC=(V-V_{min})/(V_{max}-V_{min})$$

5. The energy dynamic control method for the EPS with hybrid power supply described in claim 1 is characterized that the calculation formula of maximum charging current $I_1$ is $I_1=(1-SOC)\cdot Q/T_{jmin}$ and the calculation formula of the maximum discharging current $I_2$ is $I_2=(SOC-SOC')\cdot Q/T_{max}$, where $T_{jmin}$ is the minimum interval time of two times of extremely low-speed steering, Q is the capacity of the super-capacitor, $T_{max}$ is the longest time during which the single extremely low-speed steering is implemented, SOC' is the minimum state of charge of the super-capacitor.

6. The energy dynamic control method for the EPS with hybrid power supply described in claim 1 is characterized that the current $I'_D$ of the vehicle power supply in the optimal working range is obtained by the efficiency test of the alternator in the vehicle power supply.

7. The energy dynamic control method for the EPS with hybrid power supply described in claim 1 is characterized that the specific process of step 6 is as follows:
   step 6.1: when the super-capacitor is in the charging state, the difference of current I' is compared with the maximum charging current $I_1$, if the difference of current I' does not exceed the maximum charging current $I_1$, the charging current $I_C$ of the super-capacitor will be set as I', otherwise the charging current $I_C$ will be set as $I_1$;
   step 6.2: when the super-capacitor is in the discharging state, the difference of current I' is compared with the maximum discharging current $I_2$ if the absolute value of the difference of current I' does not exceed the maximum discharging current $I_2$ the discharging current $I_C$ of the super-capacitor will be set as I', otherwise the discharging current will be set as $-I_2$.

8. The energy dynamic control method for the EPS with hybrid power supply described in claim 1 is characterized that the working modes of hybrid power supply system including vehicle power supply mode, hybrid power supply mode and super-capacitor mode.

* * * * *